United States Patent
Suzuki

(10) Patent No.: US 9,402,023 B2
(45) Date of Patent: Jul. 26, 2016

(54) IMAGE CAPTURING APPARATUS, CONTROL METHOD THEREFOR, AND STORAGE MEDIUM

(71) Applicant: CANON KABUSHIKI KAISHA, Tokyo (JP)

(72) Inventor: Yasuyuki Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/632,510

(22) Filed: Feb. 26, 2015

(65) Prior Publication Data

US 2015/0249784 A1 Sep. 3, 2015

(30) Foreign Application Priority Data

Mar. 3, 2014 (JP) ................................. 2014-041048

(51) Int. Cl.
*H04N 5/232* (2006.01)
*G02B 7/28* (2006.01)
*H04N 5/372* (2011.01)

(52) U.S. Cl.
CPC .............. *H04N 5/23212* (2013.01); *G02B 7/28* (2013.01); *H04N 5/23258* (2013.01); *H04N 5/372* (2013.01)

(58) Field of Classification Search
CPC .......... H04N 5/23212; H04N 5/23258; H04N 5/372; G02B 7/28; G02B 7/34
USPC .............. 348/345, 349, 169, 352; 396/89, 133
See application file for complete search history.

(56) References Cited

U.S. PATENT DOCUMENTS

| 5,327,190 | A | * | 7/1994 | Nakamura | ................ | G02B 7/28 396/95 |
| 5,598,247 | A | * | 1/1997 | Watanabe | ................ | G02B 7/28 396/133 |
| 2012/0300083 | A1 | * | 11/2012 | Funamoto | .......... | H04N 5/23212 348/169 |

FOREIGN PATENT DOCUMENTS

| JP | 08075991 A | * | 3/1996 | ............... G02B 7/28 |
| JP | 3445311 B2 | | 9/2003 | |
| JP | 4689023 B2 | | 5/2011 | |

* cited by examiner

*Primary Examiner* — Nhan T Tran
(74) *Attorney, Agent, or Firm* — Cowan, Liebowitz & Latman, P.C.

(57) ABSTRACT

An image capturing apparatus comprises: a focus detection unit; a mirror movable between a first position where the mirror is inserted in an imaging light path a second position where the mirror is withdrawn from the imaging light path; and a calculation unit configured to predict a moving amount of a subject on the basis of a history of focus detection result and calculate an in-focus position using the predicted moving amount. In a case of continuously performing first and second image shootings, the calculation unit performs the prediction for the second image shooting before the mirror finishes moving from the second position in the first image shooting to the first position, and the focus detection unit continues charge accumulation until the mirror starts to move from the first position to the second position for the first image shooting.

9 Claims, 7 Drawing Sheets

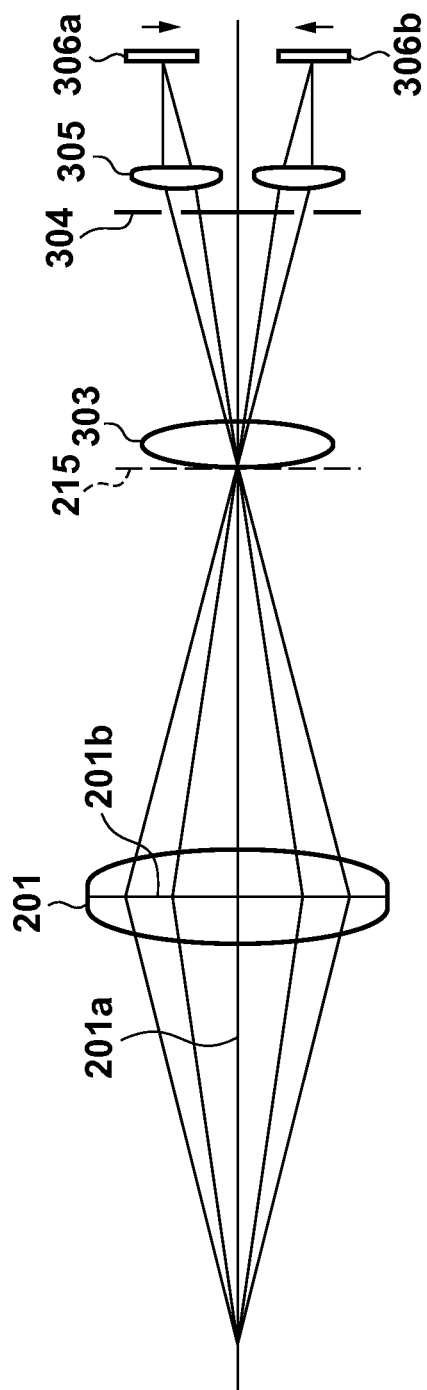

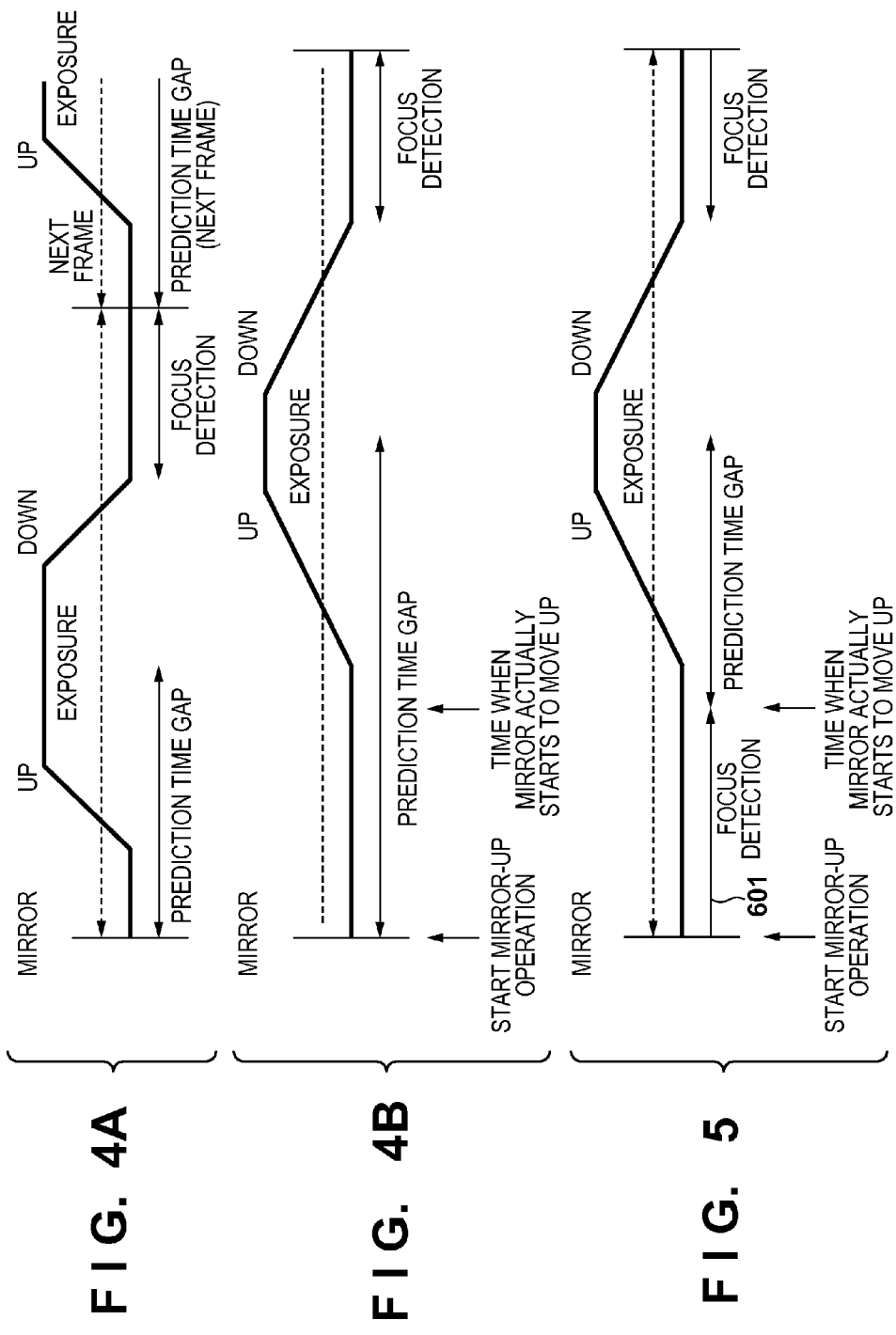

IMAGE CAPTURING APPARATUS, CONTROL METHOD THEREFOR, AND STORAGE MEDIUM

BACKGROUND OF THE INVENTION

1. Field of the Invention

The present invention relates to an image capturing apparatus and a control method therefor and, more specifically, to an image capturing apparatus that performs automatic focus detection and a control method therefor.

2. Description of the Related Art

Conventionally, a focus detection apparatus in a camera which receives light that has passed through an imaging lens and accumulates charge by an AF sensor, and detects a defocus amount on the basis of an image signal of a subject read out from the AF sensor is known. Meanwhile, there is a control method, adapted in focus detection apparatuses, to keep focusing on a moving subject by driving an imaging lens in connection with the movement of the subject. In order to keep focusing on a moving subject, focus detection is generally performed for each frame, and an imaging lens is moved in accordance with a value obtained by adding an amount to a predicted future position of the moving subject to the focus detection result. In predicting the future position of the moving subject, an amount (correction amount) that the subject will move during a period since mirror-up operation is started after the focus detection is ended until an image sensor starts to be exposed as shown in FIG. 4A. Conventionally, many focus control apparatuses having a variety of means for obtaining such correction amount have been proposed.

For example, Japanese Patent No. 3,445,311 discloses means that calculates a correction amount on the basis of the sum of a mirror-up time, that has measured at a previous time, and a driving time corresponding to a time lag correction amount calculated on the basis of a following speed that is set in accordance with a moving speed of a subject. Further, Japanese Patent No. 4,689,023 discloses a focus control apparatus that sets the number of times focus detection is to be performed in accordance with a set continuous shooting rate, controls to detect a focus amount and move an imaging lens for the set number of times during each interval between shootings in the continuous shooting.

Meanwhile, there is an image shooting mode (silent image shooting mode) that enables silent capturing of an image by performing the mirror-up and mirror-down operation more quietly (i.e., moving the mirror slowly) than in a normal image shooting mode. In the silent image shooting mode, as shown in FIG. 4B, it is possible to perform image capturing operation quietly by taking a longer time to move up and down the mirror than in the normal image shooting mode. Further, there is a camera that requires time since mirror-up operation is started until a mirror actually starts to move up as shown in FIG. 4B due to a mechanical structure. For example, a conventional camera having such mechanical structure that controls driving of a main mirror and a focal plane shutter using one motor requires a charging period of the motor in order to perform mirror-up operation slowly. This charging period is the main cause of taking time since the mirror-up operation is started until the mirror actually starts to move up. In cameras which take time for mirror-up operation and cameras which take time before a mirror actually starts to move up, a period of time since focus detection is performed last time until exposure starts is long, and thus an interval (prediction time gap) between a time at which a moving amount of a subject is predicted and a time at which the subject is actually shot becomes long.

In an example of an apparatus disclosed in Japanese Patent No. 3,445,311, if a prediction time gap becomes longer, it becomes more difficult to predict how the subject moves during the interval. If the accuracy of the predicted moving amount of the subject deteriorates, a possibility that the subject will be properly focused decreases accordingly. In an example of an apparatus disclosed in Japanese Patent No. 4,689,023, it is considered that the time taken to move up and down a mirror becomes long, which causes deterioration of a predicted moving amount of the subject, and a possibility that the subject will be properly focused decreases as in the case of Japanese Patent No. 3,445,311.

SUMMARY OF THE INVENTION

The present invention has been made in consideration of the above situation, and maintains ability to follow a moving subject during performing focus detection even in a case where it takes time to move a mirror up.

According to the present invention, provided is an image capturing apparatus comprising: a focus detection unit, having a sensor for receiving light that has passed through an imaging optical system and accumulating charge, configured to perform focus detection on the basis of a signal generated by the sensor; a mirror configured to be movable between a first position where the mirror is inserted in an imaging light path and leads light that has passed through the imaging optical system toward the focus detection unit, and a second position where the mirror is withdrawn from the imaging light path; and a calculation unit configured to predict a moving amount of a subject on the basis of a history of focus detection result by the focus detection unit, and calculate an in-focus position using the moving amount of the subject, wherein, in a case of continuously performing first image shooting and second image shooting in response to an image shooting instruction, the calculation unit performs the prediction of the moving amount of the subject used for calculating the in-focus position for the second image shooting before the mirror finishes moving from the second position to which the mirror is moved for the first image shooting to the first position, and wherein the focus detection unit is capable of continuing charge accumulation in the sensor until the mirror starts to move from the first position to the second position for the first image shooting.

Further, according to the present invention, provided is a control method for an image capturing apparatus that has a focus detection unit, having a sensor for receiving light that has passed through an imaging optical system and accumulating charge, configured to perform focus detection on the basis of a signal generated by the sensor, and a mirror configured to be movable between a first position where the mirror is inserted in an imaging light path and leads light that has passed through the imaging optical system toward the focus detection unit, and a second position where the mirror is withdrawn from the imaging light path, said method comprising: performing focus detection on the basis of the signal generated by the sensor of the focus detection unit; and predicting a moving amount of a subject on the basis of a history of focus detection result by the focus detection unit, and calculating an in-focus position using the moving amount of the subject, wherein, in a case of continuously performing first image shooting and second image shooting in response to an image shooting instruction, the prediction of the moving amount of the subject used for calculating the in-focus position for the second image shooting is made before the mirror finishes moving from the second position in the first image shooting to the first position, and wherein the focus detection unit is capable of continuing charge accumulation in the sensor until the mirror starts to move from the first position to the second position for the first image shooting.

Furthermore, according to the present invention, provided is a non-transitory readable storage medium having stored thereon a program which is executable by an image capturing apparatus, the program having a program code for realizing the above control method.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 2 is a diagram illustrating an optical arrangement of members relating to focus detection according to the embodiment;

FIGS. 4A and 4B are time charts illustrating conventional movement of a mirror and timing of focus detection;

FIG. 5 is a time chart illustrating movement of a mirror and timing of focus detection according to the embodiment;

DESCRIPTION OF THE EMBODIMENTS

Exemplary embodiments of the present invention will be described in detail in accordance with the accompanying drawings.

Figure 1:
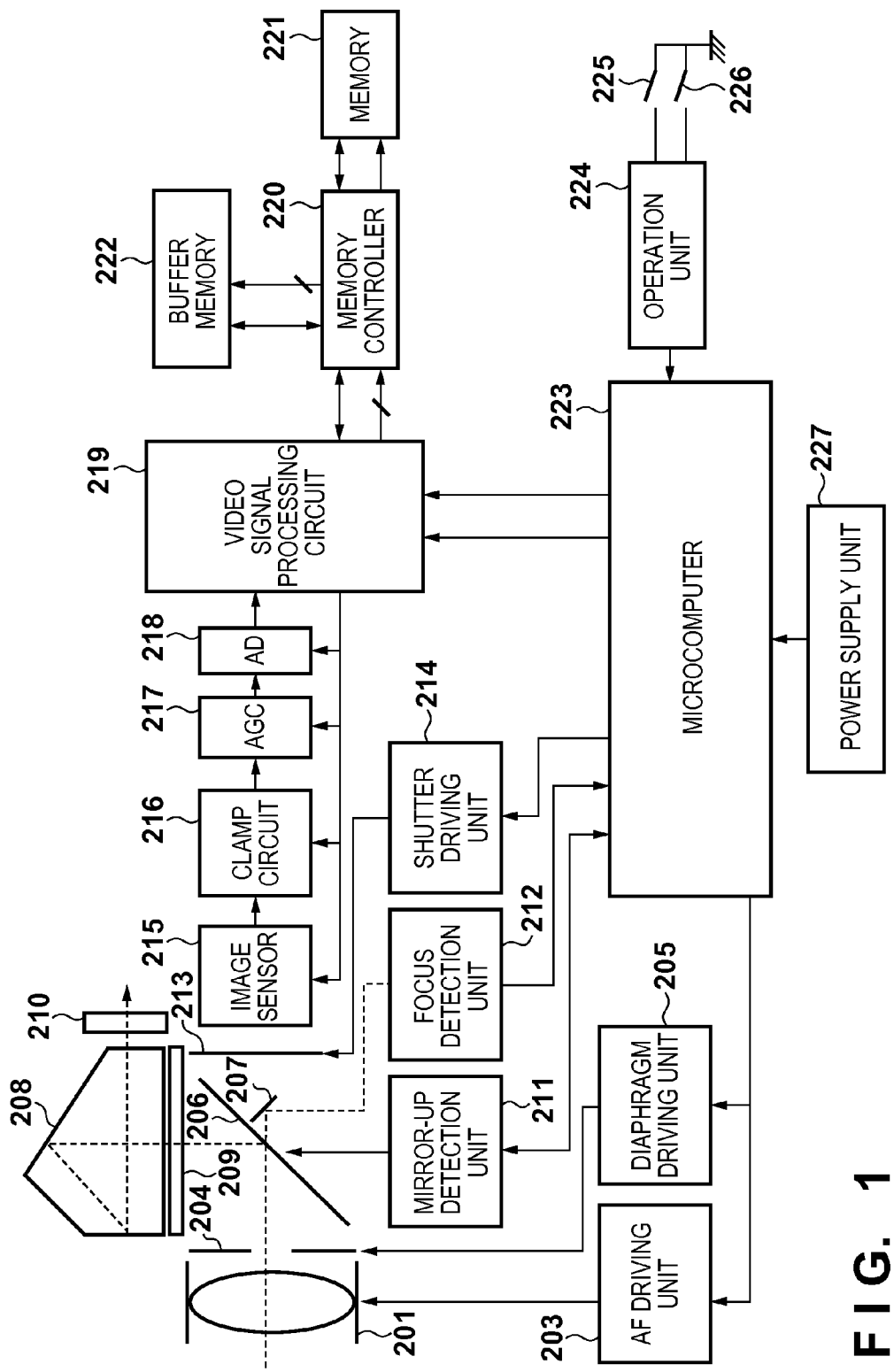
FIG. 1 is a block diagram illustrating a configuration of a single-lens reflex camera according to an embodiment of the present invention.

FIG. 1 is a block diagram illustrating a configuration of a single-lens reflex camera as an example of an image capturing apparatus according to an embodiment of the present invention.

A light flux from a subject passes through an imaging lens 201 and a diaphragm 204, and enters a main mirror 206 as an optical member. It should be noted that the imaging lens 201 is shown by a single lens in FIG. 1 for purposes of simplicity, however, is actually formed from a plurality of lenses. The main mirror 206 reflects the entered light flux toward a focusing screen 209 when it is at a mirror-down position at which the main mirror 206 is inserted in a light path. When an image shooting is to be performed, the main mirror 206 flips up (mirror-up) together with a sub-mirror 207 which is another optical member, to withdraw from the light path so as to introduce the light flux to the image sensor 215. A mirror-up detection unit 211 electrically detects that the main mirror 206 starts to move up as will be described later, and notifies a microcomputer 223 of it.

When the main mirror 206 is at the mirror-down position, the light flux is reflected upward by the main mirror 206 and forms an optical image of the subject on the focusing screen 209. A photographer can observe this image via a pentaprism 208 and an eyepiece 210.

The central portion of the main mirror 206 is made of a half mirror, and passes part of the light flux when the main mirror 206 is at the mirror-down position. The light flux that has passed through the main mirror 206 is bent downward to a focus detection unit 212 by the sub-mirror 207 arranged behind the main mirror 206. A defocus amount that shows a focus state of the imaging lens 201 on the subject is obtained by calculating, by the microcomputer 223, the output from a pair of AF sensors that perform photoelectric conversion, which will be described later, arranged within the focus detection unit 212. The microcomputer 223 evaluates the calculation result and controls an autofocus (AF) driving unit 203. The AF driving unit 203 comprises a DC motor or an ultrasonic wave motor, for example, and adjusts focus by changing the position of a focus lens included in the imaging lens 201 under control of the microcomputer 223.

Further, a diaphragm driving unit 205 drives the diaphragm 204 by a driving amount which is calculated by the microcomputer 223 on the basis of the photometry result obtained from a photometry unit (not shown), thereby changing an optical f-number. A shutter driving unit 214 drives a focal plane shutter 213. The open time of the shutter is controlled by the microcomputer 223 on the basis of the photometry result obtained from the photometry unit (not shown).

A CCD sensor or a CMOS sensor may be used as the image sensor 215, and the image sensor 215 photoelectrically converts an optical image of the subject, formed by the imaging lens 201 while the main mirror 206 and the sub-mirror 207 are at the mirror-up position and the shutter 213 is open, into an electrical signal. The electrical signal output from the image sensor 215 undergoes basic analog signal processes in a clamp circuit 216 and an AGC circuit 217 prior to A/D conversion. A clamp level and an AGC reference level are changed by the microcomputer 223.

The output from the AGC circuit 217 is input to an A/D converter 218 where an analog signal is converted to a digital signal, and then the converted digital signal is output to a video signal processing circuit 219. The video signal processing circuit 219 is realized by a logic device, such as a gate array, and applies filter processing, color conversion processing, and gamma processing to the digital image data, as well as applies compression processing conforming to the JPEG standard, for example, and outputs the result to a memory controller 220. The video signal processing circuit 219 is capable of outputting information on exposure and white balance to the microcomputer 223 as needed. The microcomputer 223 makes instructions for white balance adjustment and gain control based on the information. In a case of performing continuous shooting, image data is temporarily stored in a buffer memory 222 without being processed. After the continuous shooting is finished, the stored image data is read out via the memory controller 220, and applied with image processes and compression process by the video signal processing circuit 219. The maximum number of images that can be captured in one continuous shooting operation depends on the capacity of the buffer memory 222.

The memory controller 220 stores in the buffer memory 222 the unprocessed digital image data input from the video signal processing circuit 219 as described above, and stores the processed digital image data to a memory 221. Inversely, the memory controller 220 reads image data from the buffer memory 222 or the memory 221 and outputs it to the video signal processing circuit 219. Note that the memory 221 may be configured as detachable.

An operation unit 224 transmits an operation by a photographer to the microcomputer 223, in turn, the microcomputer 223 controls each unit in accordance with the change of the operation unit 224. The operation unit 224 can switch between a plurality of shooting modes. The plurality of shooting modes include a one-shot mode which is suitable for shooting a still subject and an AI-servo mode which is suitable for shooting a subject the distance to which changes continuously. Further, it is possible to switch to an AI-focus mode in which the camera automatically changes from the one-shot mode to the AI-servo mode in accordance with the state of the subject.

A switch SW1 (225) and a switch SW2 (226) turn on/off in response to an operation to a release button (not shown), and constitute part of input switches to the operation unit 224. A half-stroke of the release button turns on only the switch SW1 (225), and in response to this, autofocus operation and photometry operation are performed.

Further, a full-stroke of the release button turns on both of the switches SW1 (225) and SW2 (226), and in response to this, image shooting is performed. In a case where the continuous shooting mode is set, the continuous shooting is performed while both of the switches SW1 (225) and SW2 (226) are on. Besides the switches SW1 (225) and SW2 (226), an ISO setting button, an image size setting button, an image quality setting button, an information display button, and other not-shown switches are connected to the operation unit 224, and the operation unit 224 detects the states of these switches. A power supply unit 227 provides necessary power to each IC and driving system.

Next, an optical arrangement of members used in focus detection is shown in FIG. 2. Note that the same constituent elements as those shown in FIG. 1 are referred to by the same reference numerals. Further, in FIG. 2, the main mirror 206 and the sub-mirror 207 are not shown, and the rest of the constituent elements are shown as being developed along the optical axis 201a of the imaging lens 201.

The focus detection unit 212 is comprised of a field lens 303, a diaphragm 304 having a pair of apertures, a pair of secondary imaging lenses 305, a pair of AF sensors 306a and 306b formed with line sensors or the like.

A light flux emitted from a point on the optical axis 201a passes through the imaging lens 201, and part of the light flux that has passed through the main mirror 206 is reflected by the sub-mirror 207, and converges near the field lens 303 that is arranged on a conjugate plane of an imaging plane of the image sensor 215. Thereafter, the light flux converges again on the pair of AF sensors 306a and 306b with a distance via the field lens 303, the diaphragm 304 and the secondary imaging lenses 305. The AF sensors 306a and 306b photoelectrically convert the formed images of the subject, and output electrical signals representing the pair of images.

The field lens 303 is arranged so as to form images near the pupil 201b of the imaging lens 201 and the entrance pupils of the pair of secondary imaging lens 305, namely near the diaphragm 304, and the pupil 201 of the imaging lens 201 is split in the vertical direction in FIG. 3 with respect to the pair of apertures of the diaphragm 304.

With the above configuration, when the imaging lens 201 is extruded to the left in the figure and the light flux converges at a position shifted to the left from the image sensor 215, the pair of images formed on the pair of AF sensors 306a and 306b shifts in the direction of arrows. By contrast, when the imaging lens 201 is intruded to the right in the figure, the pair of images formed on the pair of AF sensors 306a and 306b shifts in the opposite direction of the arrows. By detecting the relative shift amount of the pair of images by the AF sensors 306a and 306b, it is possible to detect the focus state of the imaging lens 201 and perform focus adjustment operation of the imaging lens 201.

Thus, the focus state of the imaging lens 201 is detected by using the focus detection unit 212 having the configuration as described above, and the imaging lens 201 is controlled to follow the subject at high precision.

Next, the relationship between the line sensors of the AF sensors 306a and 306b and the AF frames in the imaging frame will be explained with reference to FIGS. 3A and 3B.

Figure 3A:
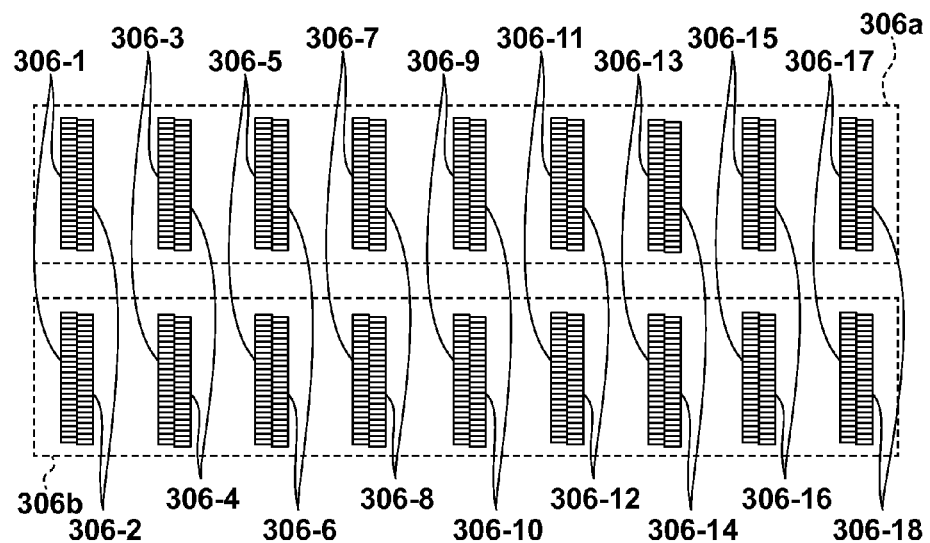
FIGS. 3A and 3B are diagrams illustrating relationship between an arrangement of line sensors and AF frames.

FIG. 3A shows an example of an arrangement of the line sensors of the AF sensors 306a and 306b. Each of the line sensor pairs 306-1 to -18 are formed with a pair of sensor arrays, wherein each sensor array has a configuration such that a plurality of pixels, as sensors, are arranged in line, and it is possible to obtain a signal image from outputs of the respective pixels of each sensor array. It is possible to detect a focus state (defocus amount) of the imaging lens 201 from a phase difference between the signal images obtained from each pair of the sensor arrays, and detect the in-focus position of the imaging lens 201 on the basis of the detected focus state (focus detection processing). Each of the line sensor pairs 306-1 to -18 are projected on nearly the same areas in the angle of view (frame) by a focus detection optical system, such as the secondary imaging lenses 305, and these areas form focus detection points.

Figure 3B:
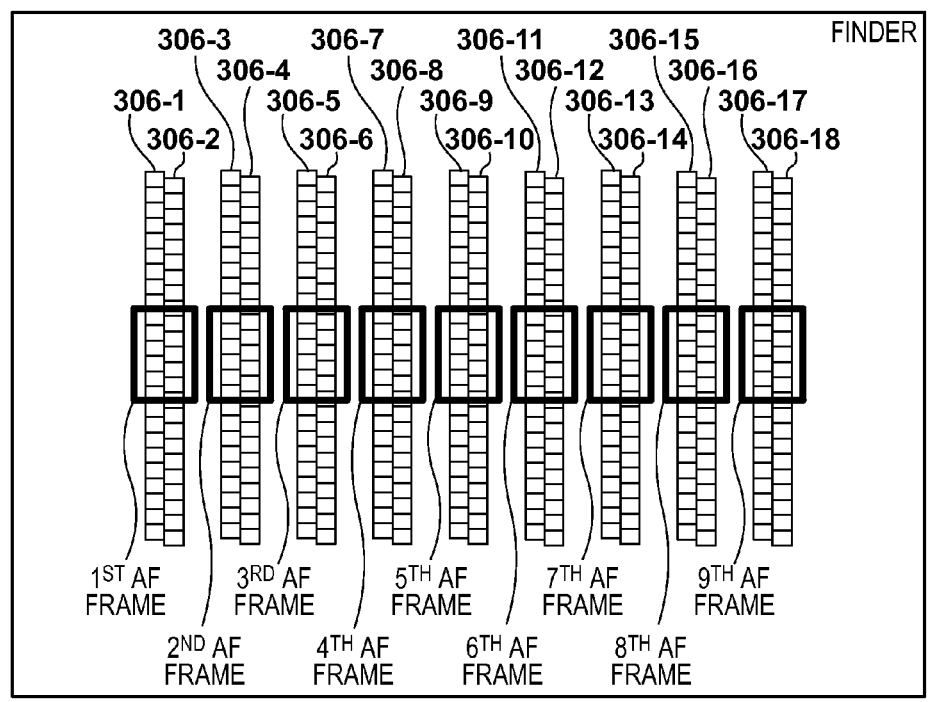

FIG. 3B is a diagram illustrating an example of positional relationship between an AF fields on a finder screen corresponding to the AF sensors 306a and 306b shown in FIG. 3A and the line sensor pairs 306-1 to -18. On the finder screen (field of view), nine AF frames are arranged in line in the horizontal direction. The first AF frame is formed over an area to which the line sensor pairs 306-1 and 306-2 are projected. The second to ninth AF frames are formed in the similar manner to the first AF frame, and each AF frame is formed over an area to which two line sensor pairs are projected.

It should be noted that, as shown in FIGS. 3A and 3B, the adjoining sensor arrays are shifted from each other by a half pitch in the embodiment. Generally, when a spatial frequency of the subject is high, a detected defocus amount often includes an error depending on the relationship between the pixel positions of the sensor arrays and a phase of the contrast of a subject. Accordingly, in order to reduce the error, an average value of two defocus amounts obtained by using two pairs of sensor arrays that are shifted by a half pitch is used.

Note that, in FIGS. 3A and 3B, 18 pairs of line sensors shifted in the vertical direction are arranged to make 9 AF frames, however, the arrangement of the line sensors are not limited to this. For example, the line sensors may be shifted in the horizontal direction, or the line sensors shifted in the vertical direction and the line sensors shifted in the horizontal direction may be arranged in combination. Further, the number of pairs of the line sensors may be greater or less than 18.

Next, focus control processing according to the embodiment of the present invention will be explained. As described above, there is a camera that requires time since mirror-up operation is started until a mirror actually starts to move up due to a mechanical structure when a silent image shooting mode is set as shown in FIG. 4B. A camera having a mechanical structure that controls driving of the main mirror 206 and the focal plane shutter 213 using one motor requires a charging period of the motor in order to perform mirror-up operation slowly. This charging period is a main cause of taking time since the mirror-up operation is started until the mirror actually starts to move up.

According to the embodiment, in the camera having the above configuration, the focus detection processing is continuously performed during a period since the mirror-up operation is started until the mirror actually starts to move up as shown in FIG. 5. By doing so, the prediction time gap between a time at which a moving amount of a subject is predicted and a time at which the subject is actually shot is shortened, thereby improving reliability of a predicted moving amount of the subject, and improving probability that the subject is properly focused. A method of electrically detecting that the mirror actually starts to move up and a method of using a preset period as a period since the mirror-up operation is started until the mirror actually starts to move up are considered, and either of the methods may be used. As a time when the mirror-up operation is started, a time when the mirror-up operation is instructed may be used as a reference. In the embodiment, a case of electrically detecting the mirror-up operation by the mirror-up detection unit 211 will be explained.

Figure 6:
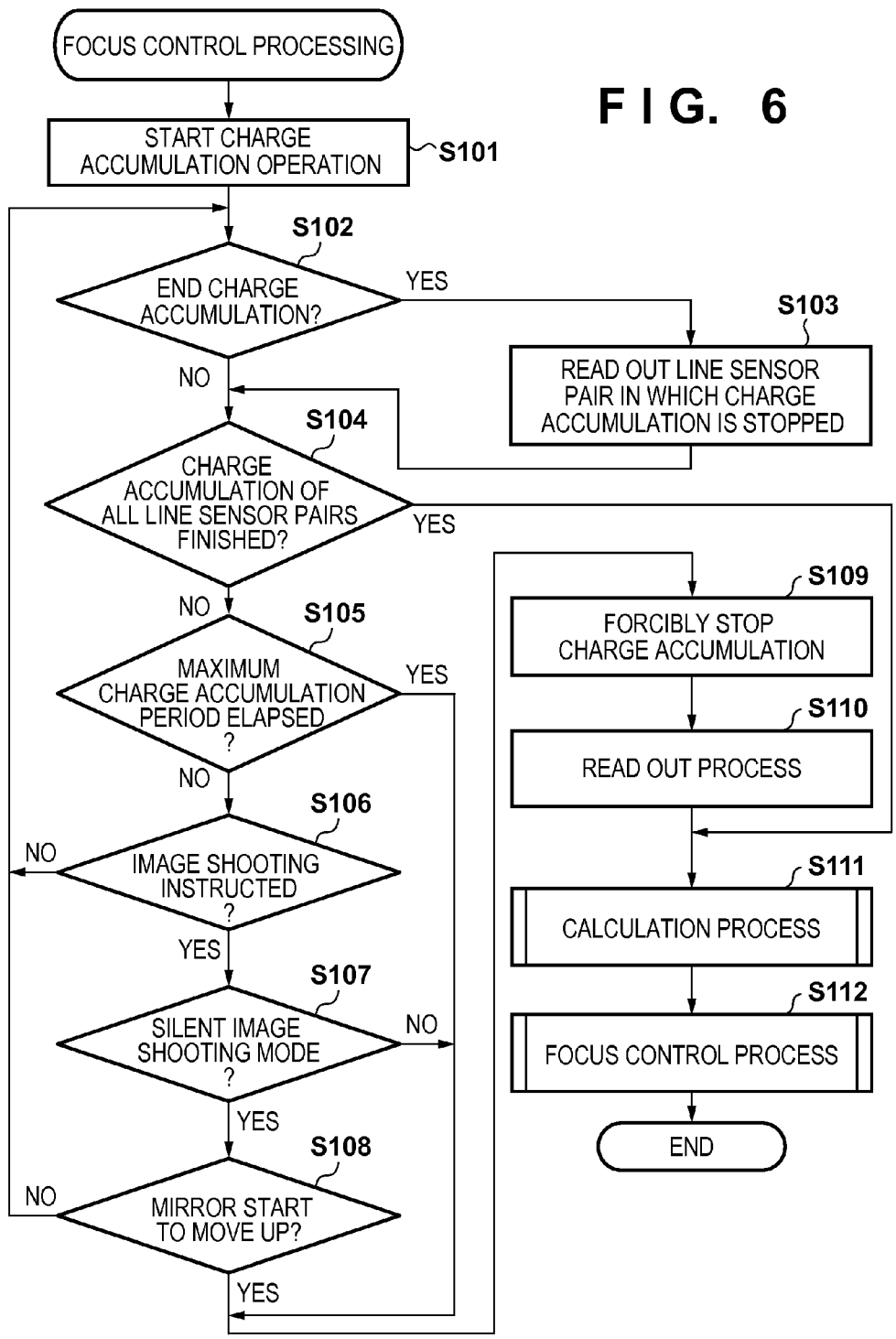
FIG. 6 is a flowchart showing focus control processing according to the embodiment.

Next, the focus control processing will be explained with reference to a flowchart in FIG. 6. The processing shown in FIG. 6 is performed once in response to turning-on of the switch SW1 in a case where the one-shot mode is set, whereas it is repeatedly performed at a predetermined cycle in a case where AI-servo mode is set.

Charge accumulation operation in the AF sensors 306a and 306b is started in step S101, and if there is any line sensor pair 306-n which have accumulated charge to a signal level suitable for focus detection (Yes in step S102), the process proceeds to step S103. More specifically, in step S102, it is determined whether or not there is any line sensor pair 306-n in which the maximum signal level of accumulated charge exceeds a predetermined threshold, or the difference between the maximum signal level and the minimum signal level exceeds a predetermined threshold, for example. In step S103, charge accumulation of the line sensor pair 306-n which are determined that they have accumulated charge of a signal level suitable for focus detection is stopped, the accumulated charge is read out, and the process proceeds to step S104. In step S104, whether or not charge accumulation of all the line sensor pairs 306-1 to -n is finished is determined, and if yes, the process proceeds to step S111. If not, the process proceeds to step S105.

In step S105, it is determined whether or not a charge accumulation period of the line sensor pair 306-n which continue charge accumulation exceeds a predetermined maximum charge accumulation period. If yes, the process proceeds to step S109 where the charge accumulation is forcibly stopped. If not, the charge accumulation is continued, and the process proceeds to step S106, where it is determined whether or not an image shooting is instructed by turning on operation of the switch SW2 (226). If it is determined in step S106 that the image shooting is instructed, the process proceeds to step S107, whereas if not, the process returns to step S102.

In step S107, whether or not the silent image shooting mode is set is determined. If the silent image shooting mode is set, the process proceeds to step S108, whereas if not, the process proceeds to step S109. In step S108, whether or not the main mirror 206 actually starts to move up is determined, and if it does, the process proceeds to step S109, whereas if not, the process returns to step S102. The focus state detection (601) performed during a period since the image shooting is instructed until the main mirror 206 actually starts to move up as shown in FIG. 5 corresponds to the operation of step S108 to step S102.

In step S109, ongoing charge accumulation in the line sensor pair 306-n is forcibly stopped, and the process shifts to readout operation in step S110. In step S110, charge (a signal) accumulated in the line sensor pair 306-n whose charge accumulation operation is forcibly stopped is read out. In step S111, correlation calculation is performed using the readout signal to perform focus detection processing. In step S112, a moving amount of the subject in the future is predicted using the focus detection result obtained in step S111 and the focus detection results of the past plural times, and the imaging lens 201 is driven based on the predicted moving amount and the focus detection result obtained in step S111, thereby performing focus control processing.

Note that step S103 includes a process of determining whether or not to use the focus detection result that is obtained by using the signal read out from each line sensor pair 306-n in step S103 during a period since the image shooting is instructed until it is determined that the mirror actually starts to move up. The prediction of the moving amount is performed using the focus detection result/results which is/are determined to be used. This determination processing will be explained with reference to FIGS. 7 to 10.

Figure 7:
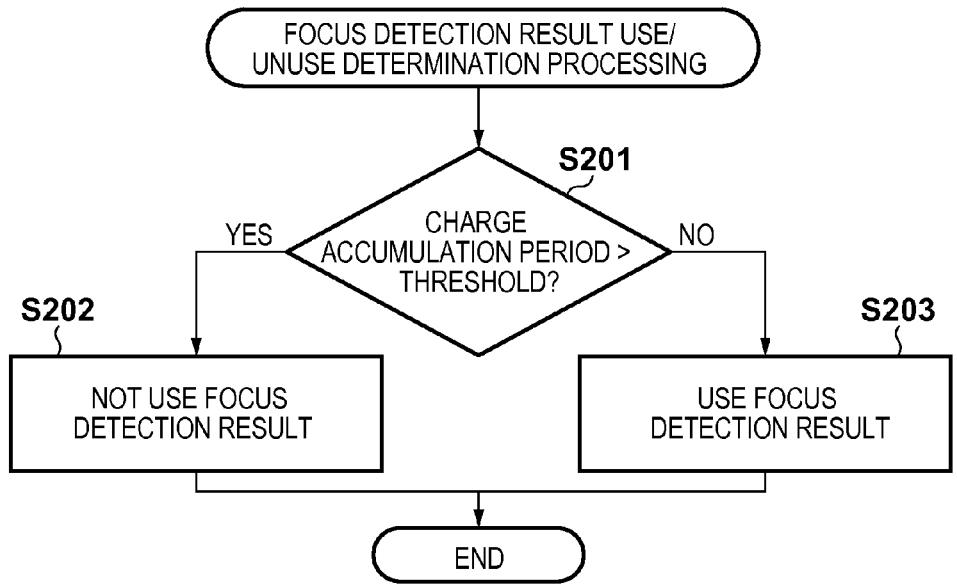
FIG. 7 is a flowchart showing determination processing for determining whether or not to use a focus detection result according to the embodiment.

FIG. 7 shows determination processing of determining use/unuse of a focus detection result using the charge accumulation period of the line sensor pair 306-n. First in step S201, it is determined whether or not the charge accumulation period of the line sensor pair 306-n whose charge accumulation operation and readout operation are completed in step S103 is longer than a predetermined threshold. The threshold used here is set to a value shorter than the maximum charge accumulation period used in step S105 in FIG. 5. If the charge accumulation period is longer than the threshold, the process proceeds to S202, and the determination is made not to use the focus detection result of the line sensor pair 306-n. If the charge accumulation period is equal to or shorter than the threshold, the process proceeds to step S203 where the determination is made to use the focus detection result of the line sensor pair 306-n assuming that the accuracy of the result is assured to a certain extent. In this manner, it is possible to exclude the focus detection result of the line sensor pair 306-n on which an image of a relatively dark subject is formed, thereby improving the accuracy of the prediction.

Figure 8:
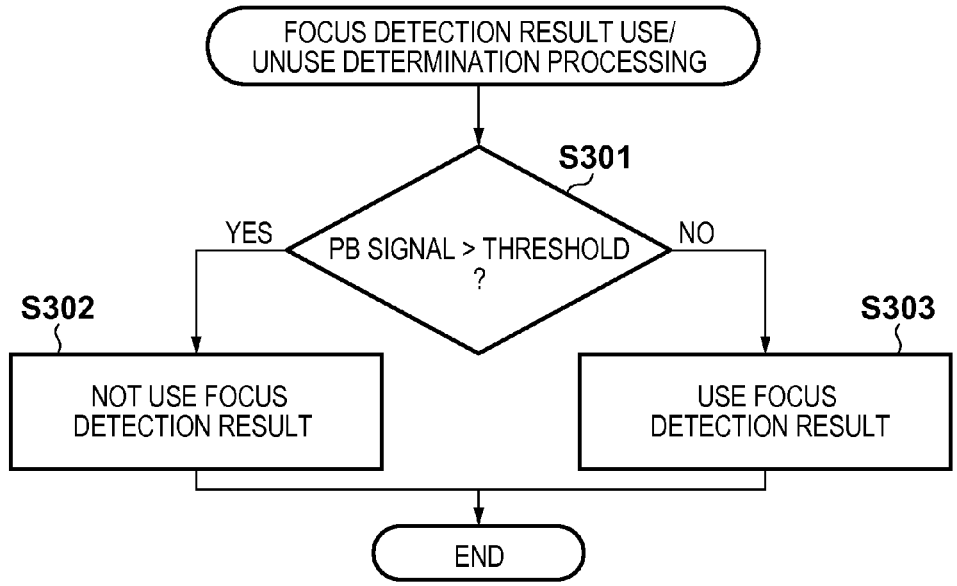
FIG. 8 is a flowchart showing another determination processing for determining whether or not to use a focus detection result according to the embodiment.

FIG. 8 is a flowchart showing determination processing of determining use/unuse of a focus detection result using a PB signal of the line sensor pair 306-n. The PB signal shows a difference between a peak signal and a bottom signal, and it is possible to assume that accuracy of the focus detection result is assured to a certain extent if the difference is large.

In step S301, it is determined whether or not the PB signal of the line sensor pair 306-n whose charge accumulation operation and the readout operation are completed in step S103 before the mirror actually starts to move up in step S108 is less than a predetermined threshold. If the PB signals is less than the threshold, the process proceeds to step S302 where the determination is mode not to use the focus detection result of the line sensor pair 306-n. If the PB signal is equal to or greater than the threshold, the process proceeds to step S303 where the determination is made to use the focus detection result of the line sensor pair 306-n assuming that the accuracy of the focus detection result is assured to a certain extent.

Figure 9:
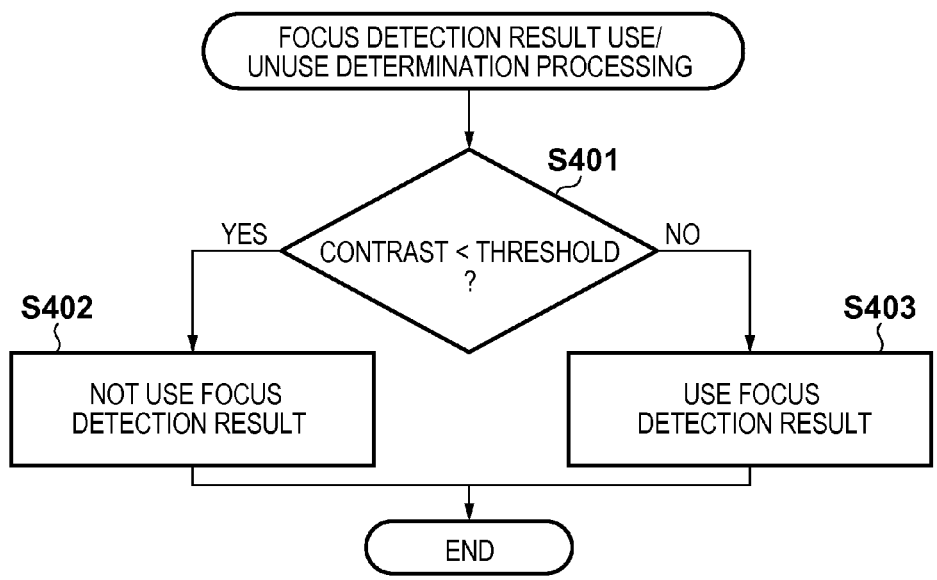
FIG. 9 is a flowchart showing still another determination processing for determining whether or not to use a focus detection result according to the embodiment.

FIG. 9 is a flowchart showing determination processing of determining use/unuse of a focus detection result using contrast of a signal of the line sensor pair 306-n. It is determined in step S401 whether or not the contrast of a signal of the line sensor pair 306-*n* whose charge accumulation operation and the readout operation are completed in step S103 before the mirror actually starts to move up in step S108 is smaller than a predetermined threshold. If the contrast is smaller than the threshold, the process proceeds to step S402 where the determination is mode not to use the focus detection result of the line sensor pair 306-*n*. If the contrast is equal to or larger than the threshold, the process proceeds to step S403 where the determination is made to use the focus detection result of the line sensor pair 306-*n* assuming that the accuracy of the focus detection result is assured to a certain extent.

Figure 10:
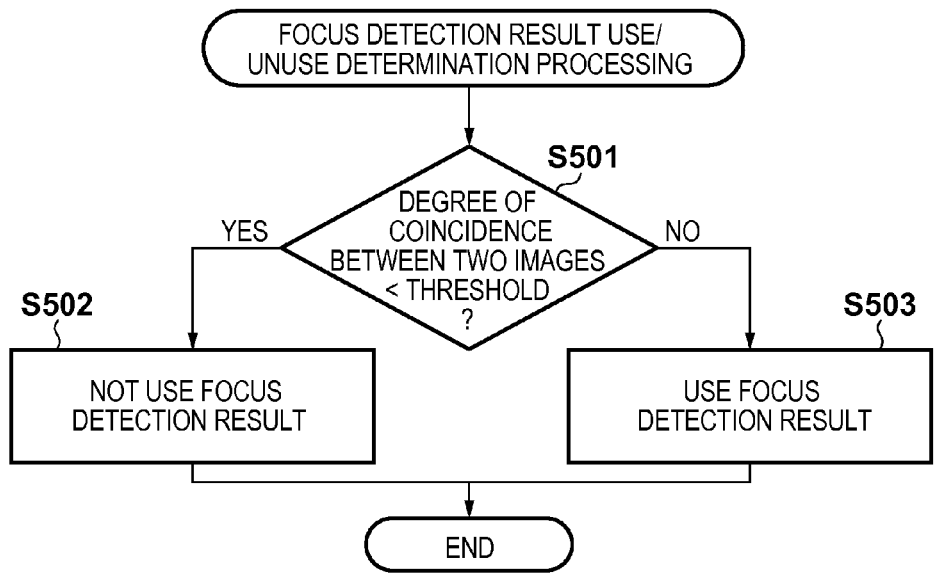
FIG. 10 is a flowchart showing still another determination processing for determining whether or not to use a focus detection result according to the embodiment.

FIG. 10 is a flowchart showing determination processing of determining use/unuse of a focus detection result using the degree of coincidence between two images obtained from the line sensor pair 306-*n*. It can be assumed that accuracy of the focus detection result is assured to a certain extent if an A image and a B image obtained from the line sensor pair 306-*n*, respectively, are similar output signals.

It is determined in step S501 whether or not the degree of coincidence between the two images obtained from the line sensor pair 306-*n* whose charge accumulation operation and the readout operation are completed in step S103 before the mirror actually starts to move up in step S108 is smaller than a predetermined threshold. If the degree of coincidence is smaller than the threshold, the process proceeds to step S502 where the determination is mode not to use the focus detection result of the line sensor pair 306-*n*. If the degree of coincidence is equal to or larger than the threshold, the process proceeds to step S503 where the determination is made to use the focus detection result of the line sensor pair 306-*n* assuming that the accuracy of the focus detection result is assured to a certain extent.

According to the embodiment as described above, in a camera having a mechanical structure that requires time since mirror-up operation is started until a mirror actually starts to move up or in a camera having the silent image shooting mode that takes a longer time before a mirror starts to move up than in the normal image shooting mode, focus detection processing is continuously performed until the mirror actually starts to move up after the mirror-up operation is stared. In this manner, a prediction time gap between a time when a moving amount of the subject is predicted and a time when the subject is actually shot can be shortened, thereby improving reliability of a predicted moving amount of the subject, and consequently, improving probability that the subject will be properly focused.

Note that it is explained above that any of the determination processing of determining use/unuse of a focus detection result described with reference to FIGS. 7 to 10 is performed, but combinations of a plurality of the above determination processing may be performed. Further, it is possible to control so as not to perform focus detection using a signal from the line sensor pair 306-*n* if the line sensor pair 306-*n* does not satisfy any of the conditions shown in FIGS. 7 to 10 in step S103.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-041048, filed on Mar. 3, 2014 which is hereby incorporated by reference herein in its entirety.

What is claimed is:

1. An image capturing apparatus comprising:
a focus detection unit, having a sensor for receiving light that has passed through an imaging optical system and accumulating charge, configured to perform focus detection on the basis of a signal generated by the sensor;
a mirror configured to be movable between a first position where the mirror is inserted in an imaging light path and leads light that has passed through the imaging optical system toward the focus detection unit, and a second position where the mirror is withdrawn from the imaging light path; and
a calculation unit configured to predict an amount corresponding to a moving amount of a subject on the basis of a history of focus detection result by the focus detection unit, and calculate an in-focus position using the amount corresponding to the moving amount of the subject,
wherein, in a case of continuously performing first image shooting and second image shooting in response to an image shooting instruction, the calculation unit performs the prediction of the amount corresponding to the moving amount of the subject used for calculating the in-focus position for the second image shooting before the mirror finishes moving from the second position to which the mirror is moved for the first image shooting to the first position, and
wherein the focus detection unit is capable of continuing charge accumulation in the sensor until the mirror starts to move from the first position to the second position for the first image shooting.

2. The image capturing apparatus according to claim 1, wherein, in response to the mirror starting to move from the first position to the second position for the first image shooting, the focus detection unit stops charge accumulation in the sensor and the calculation unit predicts the amount corresponding to the moving amount of the subject for calculating the in-focus position for the second image shooting.

3. The image capturing apparatus according to claim 1, wherein the image capturing apparatus has a first mode in which the mirror is driven at first speed and a second mode in which the mirror is driven at second speed that is slower than the first speed, and wherein the focus detection unit stops charge accumulation in the sensor in response to the image shooting instruction in the first mode, and permits to continue charge accumulation in the sensor until the mirror starts to move from the first position to the second position for the first image shooting in the second mode.

4. The image capturing apparatus according to claim 1, wherein the focus detection unit stops charge accumulation in the image sensor when a signal corresponding to charge accumulated in the sensor reaches a predetermined level or a charge accumulation period of the sensor reaches a predetermined period.

5. The image capturing apparatus according to claim 1 further comprising a determination unit configured to determine an instance in which the mirror starts to move from the first position to the second position.

6. The image capturing apparatus according to claim 5, wherein the determination unit has a structure for electrically detecting a position of the mirror.

7. The image capturing apparatus according to claim 5, wherein the determination unit determines that the mirror starts to move from the first position to the second position when a predetermined time has elapsed since the image shooting instruction is made.

8. A control method for an image capturing apparatus that has a focus detection unit, having a sensor for receiving light that has passed through an imaging optical system and accumulating charge, configured to perform focus detection on the basis of a signal generated by the sensor, and a mirror configured to be movable between a first position where the mirror is inserted in an imaging light path and leads light that has passed through the imaging optical system toward the focus detection unit, and a second position where the mirror is withdrawn from the imaging light path, said method comprising:

performing focus detection on the basis of the signal generated by the sensor of the focus detection unit; and
   predicting an amount corresponding to a moving amount of a subject on the basis of a history of focus detection result by the focus detection unit, and calculating an in-focus position using the amount corresponding to the moving amount of the subject,
   wherein, in a case of continuously performing first image shooting and second image shooting in response to an image shooting instruction, the prediction of the amount corresponding to the moving amount of the subject used for calculating the in-focus position for the second image shooting is made before the mirror finishes moving from the second position in the first image shooting to the first position, and
   wherein the focus detection unit is capable of continuing charge accumulation in the sensor until the mirror starts to move from the first position to the second position for the first image shooting.

9. A non-transitory readable storage medium having stored thereon a program which is executable by an image capturing apparatus that has a focus detection unit, having a sensor for receiving light that has passed through an imaging optical system and accumulating charge, configured to perform focus detection on the basis of a signal generated by the sensor, and a mirror configured to be movable between a first position where the mirror is inserted in an imaging light path and leads light that has passed through the imaging optical system towar the focus detection unit, and a second position where the mirror is withdrawn from the imaging light path, the program having a program code for realizing a control method comprising:

performing focus detection on the basis of the signal generated by the sensor of the focus detection unit; and
   predicting an amount corresponding to a moving amount of a subject on the basis of a history of focus detection result by the focus detection unit, and calculating an in-focus position using the amount corresponding to the moving amount of the subject,
   wherein, in a case of continuously performing first image shooting and second image shooting in response to an image shooting instruction, the prediction of the amount corresponding to the moving amount of the subject used for calculating the in-focus position for the second image shooting is made before the mirror finishes moving from the second position in the first image shooting to the first position, and
   wherein the focus detection unit is capable of continuing charge accumulation in the sensor unitl the mirror starts to move from the first position to the second position for the first image shooting.

\* \* \* \* \*